United States Patent Office 3,036,070
Patented May 22, 1962

3,036,070
SULFONILAMIDO-PYRAZOLO[3,4-d]-
PYRIMIDINES
Jean Druey, Riehen, Paul Schmidt, Therwil, and Kurt Eichenberger and Max Wilhelm, Basel, Switzerland, assignors to Ciba Corporation, a corporation of Delaware
No Drawing. Filed Nov. 21, 1958, Ser. No. 775,375
Claims priority, application Switzerland Nov. 27, 1957
13 Claims. (Cl. 260—239.65)

This invention provides pyrazolo[3,4-d]-pyrimidines containing the nucleus of the formula

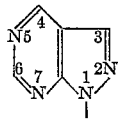

which contain, bound to a ring-carbon atom, the para-amino-benzene-sulfonamido group, and salts of these compounds, for example, their alkali metal or alkaline earth metal salts.

The new compounds may contain in the pyrazolopyrimidine nucleus further substituents, for example, especially in the 1- or 2-position aryl radicals, for example, naphthyl or phenyl radicals, which may themselves contain substituents, such as halogen atoms or alkyl, alkoxy, nitro or amino groups, or heterocyclic, araliphatic, cycloaliphatic or aliphatic radicals, for example, lower alkyl groups, such as methyl, straight chain or branched propyl, butyl or amyl radicals, or lower hydroxyalkyl or aminoalkyl groups or cyclopentyl or cyclohexyl groups.

As substituents in other positions of the pyrazolo-pyrimidine nucleus there may be mentioned principally lower alkyl groups, such as methyl, or halogen atoms, or etherified hydroxyl or mercapto groups, such as lower alkoxy or lower alkylmercapto groups or lower tertiary amino groups, such as e.g. dialkylamino, alkyleneamino, oxa- or aza-alkleneamino groups.

The invention provides more especially compounds of the formula

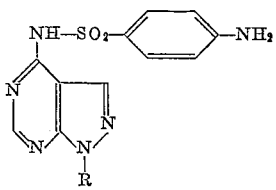

and the corresponding 2-R compounds, in which R represents hydrogen or a phenyl or cycloalkyl group, or advantageously a lower alkyl group, and salts of these compounds.

The new compounds exhibit in tests on infected animals, for example, mice infected with *Streptococcus haem.*, a surprisingly good, protracted curative action. They are therefore useful as medicaments in the treatment of infectious diseases, for example, streptococcal infections.

Especially valuable is 1-isopropyl-4-(para-amino-benzene sulfonamido)-pyrazolo[3,4-d]-pyrimidine and salts thereof, for example, its sodium salt. This sulfonamide has a good curative action also on mice infected with *Staphylococcus aureus* and can therefore also be used as medicament in staphylococcus infections.

The new sulfonamides can be made by methods known for making sulfonamides. In one process, for example, a compound of the formula

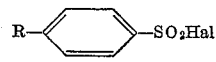

is reacted with a compound of the formula Y—R', in which X and Y are radicals capable of splitting up during the reaction except for an imino group, —NH—, present in either of these substituents, R represents the amino group or a substituent convertible into the amino group, and R' represents the radical of a pyrazolo[3,4-d]-pyrimidine bound to Y through a ring carbon atom, and, when the substituent R in the resulting compound is convertible into the amino group, the said substituent is so converted. Thus, for example, a compound of the formula

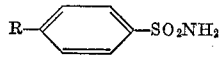

may be reacted with a compound of the formula $H_2N$—R', R and R' having the meanings given above, and Hal being a halogen atom, more especially chlorine or bromine. These reactions are advantageously carried out in the presence of a diluent and a condensing agent. A substituent convertible into the amino group is, for example, a substituent which is so convertible by hydrolysis such as an acylamino group, for example, the acetylamino or carbethoxyamino group, or by reduction such as a nitro group or azo group.

If in the processes described above there is formed a para-R-benzenesulfonamido-pyrazolo[3,4-d]-pyrimidine which contains a para-R-benzene-sulfonyl radical as a further substituent, the latter substituent can be split off by hydrolysis or aminolysis, for example, by reaction with an amine of the formula $H_2N$—R' itself. The latter hydrolysis may be brought about simultaneously with hydrolysis required to convert the radical R into the amino group.

Conversely, a sulfonamide of the formula

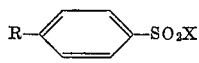

can be reacted with a halide of the formula Hal—R', preferably in the presence of a basic condensing agent, particularly a condensing agent capable of forming a salt with the sulfonamide. In this connection, the sulfonamide may be used in the form of a metal salt.

From the new aminobenzene sulfonamides salts can be made in the usual manner, for example, by reaction with bases such as alkali metal or alkaline earth metal hydroxides or organic bases.

The starting materials are known or can be made by methods in themselves known.

3-amino-pyrazolo[3,4-d]pyrimidines can be made by reacting 4-halogen-5-cyano-pyrimidines with hydrazine or hydrazines. 2-substituted 4-amino or 4-hydroxy-pyrazolo-[3,4-d]pyrimidines are prepared by the reaction of α-cyano-β-oxo-propionic acids or their functional acid- and/or oxo-derivatives with N-monosubstituted hydrazines whose N'-nitrogen atom carries a residue which can be split off by hydrolysis, followed by hydrolysis, cyclization to form the 1-substituted 3-amino-pyrazole which contains in 4-position a free, esterified or amidated carboxyl group or a nitrile group, and condensation with carboxylic acids or derivatives thereof, such as formamide, urea, thiourea, acetamidine or phosgene, at least one of the acids being present in the form of a functional derivative containing an amino group. A hydroxy group in 4-position may then be exchanged for a halogen atom and this for the amino group.

The invention also includes the new intermediate products formed in the manufacture of the sulfonamides.

The new sulfonamides and salts thereof are useful as medicaments, for example, in the form of pharmaceutical preparations which contain the active substance in admixture with a pharmaceutical organic or inorganic, solid or liquid carrier suitable for enteral, parenteral or topical administration. For making the carriers there are used substances that do not react with the active substances, for example, water, gelatine, lactose, starches, colloidal silicic acid, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, salves or creams, or in liquid form as solutions, suspensions or emulsions. If desired, they may be sterilized and/or may contain auxiliary substances, such as preserving, stabilizing, wetting, or emulsifying agents, salts for regulating the osmotic pressure or buffers. They may also contain other therapeutically valuable substances. The preparations can be made up by methods in themselves known. They contain the new sulfonamides or salts thereof in a proportion exceeding 0.1 gram per unit dose, and advantageously in a proportion within the range of 0.25 to 3 grams per unit dose.

The following examples illustrate the invention:

*Example 1*

30 grams of para-acetylaminobenzene sulfonic acid chloride are added to a solution of 17.7 grams of 1-isopropyl-4-amino-pyrazolo[3,4-d]-pyrimidine in 80 cc. of pyridine in the course of 25 minutes. When the exothermic reaction has subsided, the whole is heated for one hour at 95° C. (internal temperature), and the reaction solution is poured on to 500 cc. of 2 N-hydrochloric acid and a small amount of ice. A precipitate is formed and is filtered off with suction.

The crude product so obtained is mixed directly with 500 cc. of a 2.5 N-solution of caustic soda, the resulting suspension is boiled for 2 hours, animal charcoal is added thereto, and the mixture is filtered. The pH value of the filtrate is then adjusted to 5–6 with 5 N-hydrochloric acid, whereupon a crystalline precipitate is formed, which is filtered off with suction and recrystallized from alcohol. There is obtained 1-isopropyl-4-(para-aminobenzene-sulfonamido)-pyrazolo[3,4-d]-pyrimidine of the formula

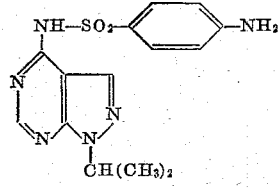

in the form of white crystals melting at 249–250° C.

The 1-isopropyl - 4 - amino-pyrazolo[3,4-d]-pyrimidine used as starting material may be prepared as follows:

8.2 grams of isopropyl hydrazine are introduced into a solution of 16.9 grams of ethoxy methylene cyanacetic ester in 100 cc. of alcohol and the whole heated to boiling for 12 hours. Evaporation under vacuum to dryness is then carried out and the residue distilled under vacuum. 2-isopropyl-3-amino-4-carbethoxy-pyrazole of the formula

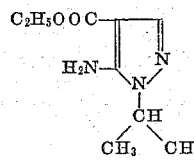

distils under 10 mm. pressure at 164–166° C. and solidifies to crystals in the receiver. The resulting colorless crystals melt from 46–48° C.

19.7 grams of 2-isopropyl-4-carbethoxy-3-amino-pyrazole are heated with 50 grams of formamide for 4 hours in a bath at 200–210° C. After cooling, the reaction mixture is taken up in 2 N-caustic soda solution, treated with animal charcoal and precipitated by adjustment to pH 3 with 2 N-hydrochloric acid. 1-isopropyl-4-hydroxy-pyrazolo[3,4-d]pyrimidine of the formula

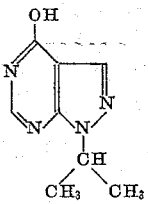

is thus obtained in crystals of M.P. 197–198° C.

7.3 grams of 1-isopropyl-4-hydroxy-pyrazolo[3,4-d]-pyrimidine are heated to boiling for 5 hours with 40 cc. of phosphorus oxychloride. The phosphorus oxychloride is evaporated off and the residue introduced into ice water, adjusted with 2 N-sodium hydroxide solution to pH 8 and extracted with ether. The ether residue is recrystallized from petroleum ether; in this manner 1-isopropyl-4-chloro-pyrazolo[3,4-d]pyrimidine of the formula

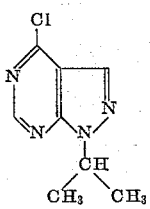

is obtained in white crystals of M.P. 53° C.

9 grams of 1-isopropyl-4-chloro-pyrazolo[3,4-d]pyrimidine and 50 cc. of liquid ammonia are heated together in a closed tube for 5 hours at 100° C. The liquid ammonia is evaporated to leave behind a white product, which is extracted with methylene chloride. The residue obtained by evaporating the methylene chloride is recrystallized from cyclohexane. The resulting 1-isopropyl-4-amino-pyrazolo[3,4-d]pyrimidine of the formula

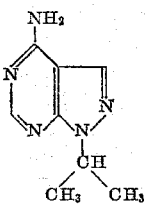

forms white crystals melting at 152–153° C.

*Example 2*

In the course of 20 minutes, 30 g. of para-acetylaminobenzenesulfonic acid chloride are added to a solution of 21.7 g. of 3-amino-6-dimethylamino-pyrazolo[3,4-d]pyrimidine in 150 cc. of pyridine. When the exothermic reaction has subsided, the mixture is heated for 1 hour to 90° C. (internal temperature), and the reaction solution is then poured into 300 cc. of 2 N-hydrochloric acid and some ice. The precipitate that forms is separated by filtration with suction.

The crude product so obtained is mixed as it is with 350 cc. of 2 N-caustic soda solution and the resulting solution is boiled for 2 hours, mixed with animal carbon, and filtered. The pH of the filtrate is adjusted to 7 with 5 N-hydrochloric acid, and a crystalline precipitate obtained which is filtered off with suction and recrystallized from much alcohol. 3-(p-amino-benzene-sulfonamido)-6-dimethylamino-pyrazolo[3,4-d]pyrimidine of the formula

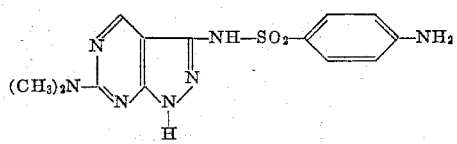

is thus obtained in the form of white crystals of melting point 285–287° C.

The 3-amino-6-dimethylamino-pyrazolo[3,4-d]pyrimidine used as starting material can be prepared as follows:

11.2 g. of potassium hydroxide and 70 cc. of methanol are cooled to 0° C. and then mixed with a solution of 44 g. of S-methylisothiourea-hydriodide in 200 cc. of methanol. The precipitated potassium iodide is removed by filtration with suction, the filtrate mixed with 33 g. of ethoxymethylene-cyanacetic acid ethyl ester while the temperature is maintained between 8 and 12° C., the yellow precipitate is filtered off and washed with cold methanol and ether. The resulting S-methyl-isothioureido-methylene-cyanacetic acid ethyl ester melts at 128–129° C.

2.1 g. of S-methyl-isothioureido-methylene-cyanacetic acid ethyl ester are mixed with 20 cc. of 0.5 N-caustic soda solution and heated at 50° C. for 10 minutes. The color of the solution changes from yellow to white. A small amount of undissolved matter is immediately filtered off with suction, the pH of the filtrate is adjusted to 1 with N-hydrochloric acid and the precipitate which forms is separated by filtering with suction. The filter residue is recrystallized from a large quantity of ethanol. There is obtained 2-methylmercapto-4-hydroxy-5-cyano-pyrimidine of the formula

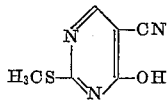

in the form of white crystals which melt at 220–222° C.

60 g. of 2-methylmercapto-4-hydroxy-5-cyano-pyrimidine are heated for 6 hours at 90–100° C. together with 60 cc. of liquid dimethylamine in a sealed tube. The excess dimethylamine is evaporated and the residue taken up in water. A small amount of undissolved matter is removed by filtering with suction, the filtrate adjusted to pH 7 with 2 N-hydrochloric acid and suction-filtered again. By recrystallization from a large quantity of ethanol there is obtained 2-dimethylamino-4-hydroxy-5-cyano-pyrimidine of the formula

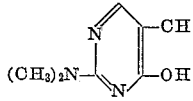

in the form of white crystals which melt at 294–296° C.

In a bath having a temperature of 110° C., 13 g. of 2-dimethylamino-4-hydroxy-5-cyano-pyrimidine are heated for 2 hours with 60 cc. of phosphorus oxychloride. The phosphorus oxychloride is then expelled, the residue put in ice water, adjusted with 2 N-caustic soda solution to a pH of 8, and extracted with chloroform. The chloroformic residue is recrystallized from benzene. There is obtained 2-dimethylamino-4-chloro-5-cyano-pyrimidine of the formula

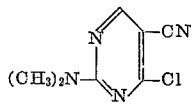

in the form of yellowish crystals of melting point 140–150° C.

8.3 g. of 2-dimethylamino-4-chloro-5-cyano-pyrimidine are mixed with a solution of 4.6 g. of hydrazine hydrate in 100 cc. of ethanol. The solution is boiled for 1 hour. After cooling, the precipitated crystalline product is separated by filtration, placed in alcoholic hydrochloric acid, heated again for 1 hour, and then allowed to cool. The precipitated product is filtered with suction and recrystallized from ethanol. The hydrochloride of 3-amino-6-dimethylamino-pyrazolo[3,4-d]pyrimidine of the formula

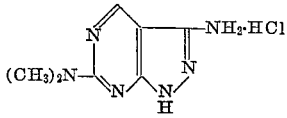

is obtained in this manner in the form of yellow crystals melting at 267–269° C. with decomposition. It is converted into the free base in the usual manner.

*Example 3*

A solution of 5.3 g. of 2-isopropyl-4-amino-pyrazolo-[3,4-d]pyrimidine in 40 cc. of pyridine is mixed with 9 g. of para-acetylamino-benzene-sulfonic acid chloride. The mixture is then heated at 90° C. (internal temperature) for 1 hour. The reaction solution is poured into 300 cc. of 2 N-hydrochloric acid and some ice. The precipitate which forms is separated by filtering with suction.

The crude product so obtained is mixed as it is with 100 cc. of 2.5 N-caustic soda solution, and the resulting suspension boiled for 2 hours, mixed with animal carbon, and filtered. The pH of the filtrate is adjusted to 4–5 with 5 N-hydrochloric acid. The crystalline precipitate which forms is recrystallized from alcohol. 2-isopropyl-4-(p-aminobenzene-sulfonamido)-pyrazolo[3,4-d]pyrimidine of the formula

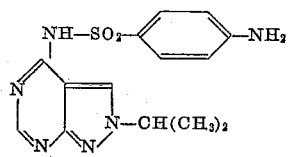

is obtained in the form of white crystals melting at 225–227° C.

The 2-isopropyl-4-amino-pyrazolo[3,4-d]pyrimidine used as starting material can be prepared as follows:

A solution of 11.6 g. of $N_1$-isopropyl-$N_2$-acetyl-hydrazine and 17 g. of ethoxymethylene-cyanacetic acid ethyl ester in 250 cc. of ethanol is refluxed for 12 hours. The ethanol is evaporated under reduced pressure, the oily residue which contains $\beta$-($N_2$-acetyl-$N_1$-isopropyl-hydrazino)-$\alpha$-cyano-acrylic acid ethyl ester is mixed with 150 cc. of 8 N-alcoholic hydrochloric acid, and the whole refluxed for 2 hours. The reaction mass is then evaporated again under reduced pressure, the residue taken up in 2 N-aqueous hydrochloric acid, a small quantity of undissolved matter removed by filtration with suction, and the pH adjusted to 8–9. There follows extraction with chloroform and recrystallization of the chloroformic residue from cyclohexane. There is thus obtained the 1-isopropyl-3-amino-4-carbethoxy-pyrazole of the formula

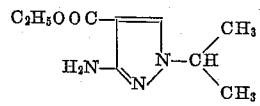

in the form of white crystals of melting point 72–73° C.

19.7 g. of 1-isopropyl-3-amino-4-carbethoxy-pyrazole in 50 cc. of formamide are heated for 5 hours in a bath having a temperature of 200–210° C. After cooling, the crystalline precipitate is filtered off with suction and crystallized from boiling ethyl alcohol for purification. 2-isopropyl-4-hydroxy-pyrazolo[3,4-d]pyrimidine of the formula

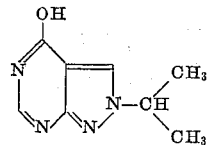

is thus obtained in the form of crystals which melt at 229–230° C.

10 g. of 2-isopropyl-4-hydroxy-pyrazolo[3,4-d]pyrimidine and 15 g. of phosphorus pentasulfide are placed in 100 cc. of pyridine and heated for 4 hours in a bath of 130° C. The hot pyridine solution is then poured into 1000 cc. of water and allowed to stand. A brown precipitate forms which is dissolved in dilute caustic soda solution, treated with animal carbon, and precipitated with dilute hydrochloric acid. On recrystallization from ethanol, 2-isopropyl-4-mercapto-pyrazolo[3,4-d]pyrimidine of the formula

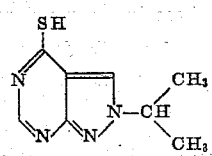

is obtained in the form of crystals of melting point 237–239° C.

19.4 g. of 2-isopropyl-4-mercapto-pyrazolo[3,4-d]pyrimidine are introduced into 150 cc. of N-caustic soda solution. The solution is slowly mixed with 16 g. of dimethylsulfate while being stirred, and stirring is continued for 30 minutes at room temperature. The precipitate which forms is separated by filtering with suction and crystallized from ethanol. In this manner 2-isopropyl - 4 - thio - 5-methyl-4,5-dihydro-pyrazolo[3,4-d]pyrimidine of the formula

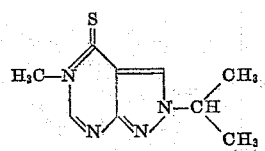

is obtained in the form of crystals which melt at 178–180° C.

The alkaline aqueous filtrate is then extracted with a large quantity of chloroform. On evaporation of the chloroform yellow crystals remain behind which are recrystallized from a small quantity of isopropyl ether. 2-isopropyl - 4-methyl-mercapto-pyrazolo[3,4-d]pyrimidine of the formula

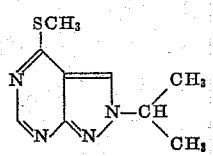

is obtained in the form of white crystals of melting point 78–79° C.

8.5 g. of 2-isopropyl-4-methylmercapto-pyrazolo[3,4-d]pyrimidine and 80 cc. of liquid ammonia are heated together at 95–100° C. for 20 hours in a pressure vessel. The residue is dissolved in 20 cc. of N-hydrochloric acid, a small amount of undissolved matter is filtered off with suction, and the filtrate treated with 10 N-caustic soda solution, a solid precipitate forming. The latter is crystallized from a mixture of ethanol and ether to obtain 2-isopropyl-4-amino-pyrazolo[3,4-d]pyrimidine of the formula

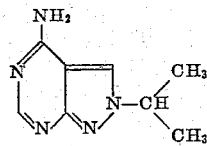

in the form of white crystals of melting point 236–237° C.

Example 4

13.35 g. of 96% para-acetylamino-benzenesulfonic acid chloride are added in the course of 30 minutes to a solution of 9.55 g. of 1-secondary butyl-4-amino-pyrazolo[3,4-d]pyrimidine in 50 cc. of absolute pyridine. When the exothermic reaction has subsided the mass is heated at 95° C. (internal temperature) for 1 hour and then evaporated under reduced pressure. The resulting residue is mixed as it is with 150 cc. of 2 N-caustic soda solution and the suspension obtained is refluxed for 2½ hours, mixed with animal carbon, and filtered. The filtrate is adjusted to a pH of 5 with 5 N-hydrochloric acid, after which a crystalline precipitate is formed which is separated by filtering with suction and recrystallized from ethanol. There is obtained in this manner the 1-secondary-butyl - 4-(para-amino-benzene-sulfonamido)-pyrazolo[3,4-d]pyrimidine of the formula

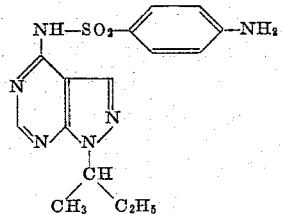

which melts at 225–226° C.

The 1-secondary-butyl-4-amino-pyrazolo[3,4-d]pyrimidine used as starting material can be prepared as follows:

16.9 g. of ethoxymethylenecyanacetic acid ethyl ester and 8.8 g. of secondary butyl-hydrazine are boiled for 10 hours in 100 cc. of absolute ethanol. The reaction mass is then evaporated in vacuo and the residue distilled in vacuo. 2-(secondary butyl)-3-amino-4-carbethoxy-pyrazole of the formula

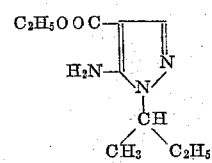

boils at 105–107° C. under a pressure of 0.09 mm. of mercury.

10.4 g. of 2-(secondary butyl)-3-amino-4-carbethoxy-pyrazole are heated to 200–210° C. for 6 hours with 25 cc. of formamide. From the reaction solution, cooled to 0° C., there is obtained the crystalline 1-(secondary butyl)-4-hydroxy-pyrazolo[3,4-d]pyrimidine of the formula

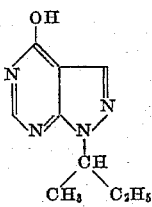

of melting point 174–175° C.

9.6 g. of 1-(secondary butyl)-4-hydroxy-pyrazolo[3,4-d]-pyrimidine are refluxed for 8 hours with 50 cc. of phosphorus oxychloride. The phosphorus oxychloride is evaporated, the residue introduced into ice water, the pH adjusted to 10 with 2 N-caustic soda solution, the reaction mass extracted with ether, and the ethereal residue distilled under reduced pressure. 1-(secondary butyl)-4-chloro-pyrazolo[3,4-d]-pyrimidine of the formula

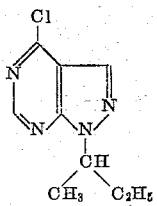

boils at 137–138° C. under a pressure of 10 mm. of mercury.

11.4 g. of 1-secondary butyl-4-chloro-pyrazolo[3,4-d]pyrimidine in 250 cc. of 8 N-alcoholic ammonia are heated at 140–150° C. for 5 hours. After cooling, the reaction mixture is evaporated to dryness, the residue mixed with water, and extracted with methylene chloride. The residue obtained on evaporation of the methylene chloride solution is 1-secondary butyl-4-amino-pyrazolo-[3,4-d]pyrimidine of the formula

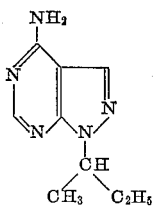

which melts at 128–130° C. After another recrystallization from ether, the melting point is at 131–132° C.

*Example 5*

A solution of 10.15 g. of 1-cyclopentyl-4-amino-pyrazolo[3,4-d]pyrimidine in 50 cc. of pyridine is mixed in the course of 30 minutes with 13.35 g. of 92.5% para-acetylaminobenzene-sulfochloride. When the exothermic reaction has subsided, the reaction mass is heated to 90° C. (internal temperature) for 1 hour and then evaporated under reduced pressure. The resulting residue is mixed as it is with 150 cc. of 2 N-caustic soda solution and the resulting suspension refluxed for 2½ hours, mixed with animal carbon, and filtered. The pH of the filtrate is adjusted to 5 with 5 N-hydrochloric acid, after which an oily precipitate forms. The supernatant aqueous solution is decanted, the oily portion taken up in 100 cc. of 2 N-caustic soda solution, filtered, and the pH of the filtrate adjusted to 4 with 5 N-hydrochloric acid, after which a viscous magma separates. The supernatant aqueous solution is decanted, and the viscous magma recrystallized from ethanol. There is obtained the 1-cyclopentyl-4-(para-aminobenzene-sulfonamido)-pyrazolo[3,4-d]pyrimidine of the formula

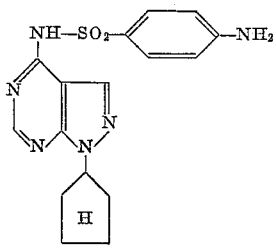

melting at 249–250° C.

The 1-cyclopentyl-4-amino-pyrazolo[3,4-d]pyrimidine used as starting material can be obtained as follows:

A solution of 200 g. of hydrazine hydrate in 572 cc. of 7 N-hydrochloric acid is mixed with 336 g. of cyclopentanone while being stirred and cooled with ice. Hydrogenation follows at room temperature and under a gauge pressure of 100 atmospheres with 2 g. of platinum oxide as catalyst. In the course of 1 hour, 89.6 liters of hydrogen are taken up, i.e. the quantity calculated for 4 molecular proportions. The catalyst is filtered off, the filtrate adjusted to pH with 2 N-hydrochloric acid, and the solution concentrated in vacuo until crystallization sets in. At this moment, 500 cc. of concentrated caustic soda solution are added with ice cooling. Solid sodium hydroxide is added until the cyclopentyl hydrazine separates in the form of an oil. The latter distills at 60–65° C. under a pressure of 11 mm. of mercury.

48.8 g. of ethoxy methylene-malonic acid-dinitrile are dissolved in 320 cc. of ethyl alcohol and mixed with a solution of 40 g. of freshly distilled cyclopentyl hydrazine in 80 cc. of ethanol. The mass is heated to the boil for 10 hours. The ethyl alcohol is evaporated off under reduced pressure, a solid product precipitating. The residue is dissolved in 80 cc. of ethyl alcohol and mixed with 500 cc. of water while stirring, the 2-cyclopentyl-3-amino-4-cyano-pyrazole of the formula

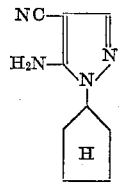

precipitating in the form of crystals of melting point 110–112° C. After one recrystallization of 40% aqueous alcohol the melting point is at 113–114° C.

20 g. of 2-cyclopentyl-3-amino-4-cyano-pyrazole are heated in 60 cc. of formamide at 200–210° C. for 8 hours. After cooling, the reaction mixture is mixed with water and extracted with methylene chloride. The residue obtained from the methylene chloride solution is dissolved in 80 cc. of N-hydrochloric acid, filtered with the addition of animal carbon, and the filtrate adjusted to pH 7 with 2 N-caustic soda solution, after which the crude 1-cyclopentyl-4-amino-pyrazolo[3,4-d]pyrimidine of the formula

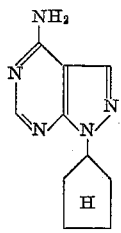

melting at 145–146° C. precipitate. For the above-described reaction it can be used as it is.

*Example 6*

A solution of 10.85 g. of 1-cyclohexyl-4-amino-pyrazolo[3,4-d]pyrimidine in 50 cc. of absolute pyridine is mixed in the course of 30 minutes with 13.9 g. of 92.5% para-acetylaminobenzenesulfonic acid chloride. When the exothermic reaction has subsided, the mass is heated to 90–95° C. (internal temperature) for 1 hour, and evaporated under reduced pressure. The residue obtained in this manner is mixed as it is with 150 cc. of 2 N-caustic soda solution and the resulting suspension refluxed for 1½ hours, mixed with animal carbon, and filtered. The pH of the filtrate is then adjusted to 4 with 5 N-hydrochloric acid, after which an oily precipitate forms. The supernatant water is then decanted and the oily precipitate mixed with 100 cc. of 2 N-caustic soda solution. The portion of the oil which is insoluble in caustic soda solution is discarded, and the aqueous alkaline solution adjusted to pH 4 with 5 N-hydrochloric acid, after which a crystalline precipitate forms. There is thus obtained the 1 - cyclohexyl - 4 - (para - amino - benzenesulfonamido) - pyrazolo[3,4-d]pyrimidine of the formula

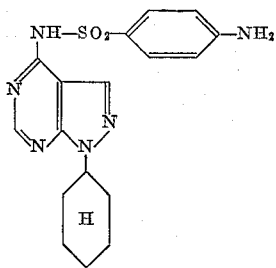

which melts at 246–247° C.

The 1-cyclohexyl-4-amino-pyrazolo[3,4-d]pyrimidine used as starting material can be prepared as follows:

A solution of 200 g. of hydrazine hydrate in 572 cc. of 7 N-hydrochloric acid is mixed with 392 g. of cyclohexanone with stirring and cooling with ice. Hydrogenation follows at room temperature and under a gauge pressure of 100 atmospheres and with the use of 2 g. of platinum oxide as catalyst. Within 30 minutes the quantity of hydrogen calculated for 4 molecular proportions, namely, 89.6 liters, is taken up. 1000 cc. of ethyl alcohol are then added in order to dissolve the precipitated crystals. The catalyst is then filtered off with suction, the filtrate adjusted to pH 4 and concentrated under reduced pressure until crystallization sets in. After cooling, the precipitated crystals are filtered off, and the filtrate mixed with 500 cc. of concentrated caustic soda solution while cooling with ice. Solid sodium hydroxide is added until the cyclohexyl hydrazine separates in the form of an oil. Under a pressure of 12 mm. of mercury, the latter distills at 77–80° C. The resulting distillate is reacted immediately with alcoholic hydrochloric acid to form the hydrochloride. Melting point, 112–113° C.

A solution of 2.3 g. of sodium in 40 cc. of absolute ethanol is added to a solution of 15.05 g. of cyclohexyl hydrazine-hydrochloride in 50 cc. of absolute ethanol. This reaction solution is mixed with 16.9 g. of ethoxy-methylenecyanacetic acid ethyl ester, dissolved in 20 cc. of ethanol, and boiled for 10 hours. After cooling, the precipitated sodium chloride is filtered off with suction and the filtrate evaporated to dryness. The crystalline residue is triturated with water and filtered with suction. There is thus obtained the 2-cyclohexyl-3-amino-4-carbethoxy-pyrazolo[3,4-d]pyrimidine of the formula

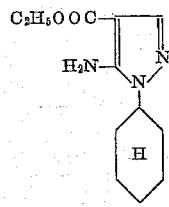

of melting point 112–114° C. After recrystallization from petroleum ether the melting point is at 115–116° C.

20 g. of 2-cyclohexyl-3-amino-4-carbethoxy-pyrazole are heated with 50 g. of formamide for 6 hours on a bath of 200–210° C. After cooling, the 1-cyclohexyl-4-hydroxy-pyrazolo[3,4d]pyrimidine of the formula

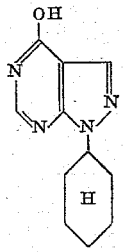

crystallizes. Its melting point is at 245–246° C.

21.8 g. of 1-cyclohexyl-4-hydroxy-pyrazolo[3,4-d] pyrimidine are boiled for 8 hours with 100 cc. of phosphorus oxychloride. The phosphorus oxychloride is evaporated, the residue introduced into ice-water, the pH adjusted to 10 with 2 N-caustic soda solution, and the whole extracted with ether. The ethereal residue is recrystallized from petroleum ether. There is obtained in this manner the 1-cyclohexyl-4-chloropyrazolo[3,4-d]pyrimidine of the formula

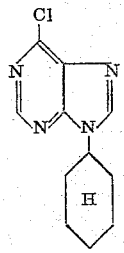

in the form of white crystals melting at 67–68° C.

In a sealed tube, 11.83 g. of 1-cyclohexyl-4-chloro-pyrazolo[3,4-d]pyrimidine and 120 cc. of 8 N-alcoholic ammonia solution are heated at 140–150° C. for 5 hours. After evaporation of the reaction solution, the residue is mixed with water and extracted with methylene chloride. From the evaporated methylene chloride solution there is obtained as residue the 1-cyclohexyl-4-aminopyrazolo-[3,4-d]pyrimidine of the formula

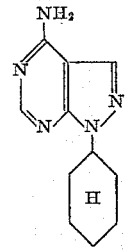

melting at 188–189° C.

*Example 7*

A solution of 10.25 g. of 1-pentyl-(3')-4-aminopyra-zolo[3,4-d]pyrimidine in 50 cc. of pyridine is mixed in the course of 30 minutes with 13.9 g. of 92.5% para-acetylaminobenzenesulfonic acid chloride. When the reaction has subsided, the mass is heated at 90° C. (internal temperature) for 1 hour, and then evaporated under reduced pressure. The residue obtained in this manner is mixed as it is with 150 cc. of 2 N-caustic soda solution, and the resulting suspension refluxed for 2½ hours, mixed with animal carbon, and filtered. The pH of the filtrate is adjusted to 4 with 5 N-hydrochloric acid solution, after which an oily precipitate forms. The supernatant aqueous solution is decanted and the oil which remains behind is dissolved in 200 cc. of N-caustic soda solution, the solution filtered, and the pH adjusted to 4 with 5 N-hydrochloric acid, after which a crystalline precipitate forms which is filtered off with suction and recrystallized from ethanol. 1 - pentyl-(3')-4-(para-aminobenzenesulfonamido)-pyrazolo[3,4-d]pyrimidine of the formula

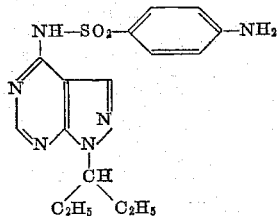

is obtained in this manner in the form of white crystals of melting point 192–192.5° C.

The 1-pentyl-(3')-4-amino-pyrazolo[3,4-d]pyrimidine used as starting material can be prepared in this manner:

While stirring and cooling with ice, a solution of 200 g. of hydrazine hydrate in 528 cc. of 7.57 N-hydrochloric acid is mixed with 344 g. of diethyl ketone. After the addition of 270 cc. of ethanol, the whole is stirred for 30 minutes. Hydrogenation follows at room temperature under a gauge pressure of 130 atmospheres with the use of 2 g. of platinum oxide as catalyst. Within 15 minutes, 89.6 liters of hydrogen, that is the quantity calculated for 4 molecular proportions, is taken up. The catalyst is filtered off, the filtrate adjusted to pH 4 with 2 N-hydrochloric acid, and the solution concentrated under reduced pressure until crystallization sets in. While cooling with ice, 500 cc. of concentrated caustic soda solution are then added. Solid sodium hydroxide is also added until the isopentyl-hydrazine separates in the form of an oil. The oil is decanted, dried over sodium hydroxide, and distilled. Pentyl-3-hydrazine passes over between 46–50° under a pressure of 12 mm. of mercury.

12.2 g. of ethoxymethylene-malonic acid dinitrile are dissolved in 200 cc. of ethyl alcohol and mixed with 10.1 g. of pentyl-3-hydrazine. The mixture is boiled for 12 hours. The ethyl alcohol is then evaporated under reduced pressure, a solid product precipitating. The latter is recrystallized from ethyl alcohol and in this manner there is obtained the 2-pentyl-(3')-3-amino-4-cyano-pyrazole of the formula

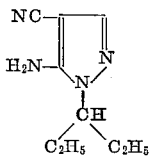

in the form of crystals melting at 140–141° C.

20 g. of 2-pentyl-(3')-3-amino-4-cyano-pyrazole are heated to 200–220° C. for 8 hours in 60 cc. of formamide. After cooling, the reaction product is mixed with water, extracted with methylene chloride and the residue obtained from the evaporated methylene chloride solution recrystallized from a mixture of ether and petroleum ether. There is thus obtained the 1-pentyl-(3')-4-amino-pyrazolo[3,4-d]pyrimidine of the formula

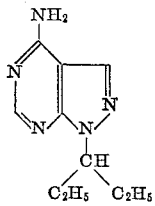

melting at 146–147° C.

*Example 8*

5 g. of sodium sulfanilamide and 5 g. of 1-methyl-4-chloro-pyrazolo[3,4-d]pyrimidine are refluxed for 6 hours in 50 cc. of absolute tetrahydrofurane. The solvent is then removed under reduced pressure and the residue dissolved in 20 cc. of 2 N-caustic soda solution. On addition of 20 cc. of 2 N-hydrochloric acid a white precipitate forms which is recrystallized from ethanol. There is obtained the 1-methyl-4-(para-amino-benzenesulfonamido)-pyrazolo[3,4-d]pyrimidine of the formula

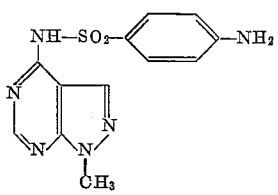

in the form of white crystals of melting point 290–291° C.

In a similar manner there are obtained from 1-isopropyl or methyl-4,6-dichloro-pyrazolo(3,4-d)pyrimidine, 1-phenyl-4-chloro-pyrazolo(3,4-d)pyrimidine or 4-chloropyrazolo(3,4-d)pyrimidine 1-isopropyl or methyl-4,6-bis-(p-amino-benzene-sulfonamido)-pyrazolo(3,4-d)pyrimidine, 1-phenyl-4-(p-amino-benzene-sulfonamido)-pyrazolo(3,4-d)pyrimidine and 4-(p-amino-benzene-sulfonamido)pyrazolo(3,4-d)pyrimidine respectively.

What is claimed is:

1. 3-R-4-$R_1$-6-$R_2$-pyrazolo[3,4-d]pyrimidines having attached to the secondary nitrogen atom of the pyrazole nucleus a member selected from the group consisting of hydrogen, unsubstituted phenyl, halogeno-phenyl, lower alkyl-phenyl, lower alkoxy-phenyl, nitro-phenyl, aminophenyl, cyclopentyl, cyclohexyl, lower alkyl, lower hydroxyalkyl and aminoalkyl, wherein one of the substituents R, $R_1$ and $R_2$ stands for p-amino-benzene sulfonylamino and the remaining two substituents stand for members selected from the group consisting of hydrogen, lower alkyl, halogeno, lower alkoxy, lower alkyl-mercapto, lower dialkylamino, lower alkyleneamino,

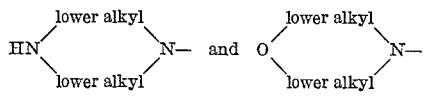

2. 3-R-4-$R_1$-6-$R_2$-pyrazolo[3,4-d]pyrimidines having attached to the secondary nitrogen atom of the pyrazole nucleus a member selected from the group consisting of hydrogen, unsubstituted phenyl, halogeno-phenyl, lower alkyl-phenyl, lower alkoxy-phenyl, nitro-phenyl, aminophenyl, cyclopentyl, cyclohexyl, lower alkyl, lower hydroxyalkyl and aminoalkyl, wherein one of the substituents R, $R_1$ and $R_2$ stands for p-R'-benzenesulfonylamino, wherein R' stands for a member selected from the group consisting of lower alkanoylamino and nitro and the remaining two substituents stand for members selected from the group consisting of hydrogen, lower alkyl, halogeno, lower alkoxy, lower alkyl-mercapto, lower dialkylamino, lower alkyleneamino

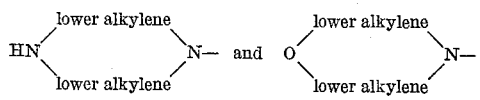

3. A compound of the formula

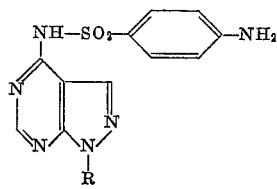

wherein R stands for lower alkyl.

4. A compound of the formula

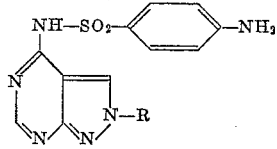

wherein R stands for lower alkyl.

5. 1-Isopropyl-4-(para-amino-benzenesulfonamido)-pyrazolo[3,4-d]pyrimidine.

6. 3-(Para-amino-benzenesulfonamido)-6-dimethylamino-pyrazolo[3,4-d]pyrimidine.

7. 1-Secondary butyl-4-(para-amino-benzenesulfonamido)-pyrazolo[3,4-d]pyrimidine.

8. 1-Phenyl-4-(para-amino-benzene-sulfonamido)-pyrazolo[3,4-d]pyrimidine.

9. 4-(Para-amino-benzenesulfonamido)-pyrazolo-[3,4-d]pyrimidine.

10. 1-Isopropyl-4-(para-acetylamino-benzenesulfonamido)-pyrazolo[3,4-d]pyrimidine.

11. A member selected from the group consisting of alkali and alkaline earth metal salts of the compounds of claim 1.

12. A member selected from the group consisting of alkali and alkaline earth metal salts of the compounds of claim 3.

13. A member selected from the group consisting of alkali and alkaline earth metal salts of the compound of claim 5.

References Cited in the file of this patent

FOREIGN PATENTS

| | | |
|---|---|---|
| 876,296 | France | July 27, 1942 |
| 880,590 | France | Jan. 4, 1943 |
| 880,591 | France | Jan. 4, 1943 |
| 882,813 | France | Apr. 8, 1943 |
| 834,995 | Germany | Mar. 27, 1952 |
| 889,300 | Germany | Sept. 10, 1953 |

OTHER REFERENCES

Justoni et al.: Gazz. Chim., It., vol. 68, pp. 59–75 (1938).

Rose: J. Chem. Soc., 1952, (pp. 3449–3464).

Rose: J. Chem. Soc., 1954 (4116–26).